(12) United States Patent
Napier et al.

(10) Patent No.: US 6,771,910 B1
(45) Date of Patent: Aug. 3, 2004

(54) OPTICAL BIT INTERLEAVING

(75) Inventors: Bruce R Napier, Torquay (GB); Alan Donaldson, Clarksville, MD (US)

(73) Assignee: Nortel Networks Limited, St. Laurent (CA)

( * ) Notice: Subject to any disclaimer, the term of this patent is extended or adjusted under 35 U.S.C. 154(b) by 558 days.

(21) Appl. No.: 09/648,151

(22) Filed: Aug. 25, 2000

(51) Int. Cl.$^7$ .............................................. G02B 6/02
(52) U.S. Cl. ................................... 398/185; 398/98
(58) Field of Search ............................ 359/180, 156, 359/246; 398/185; 385/11, 2, 123, 104

(56) References Cited

U.S. PATENT DOCUMENTS

| | | | | |
|---|---|---|---|---|
| 5,717,510 A | * | 2/1998 | Ishikawa et al. | 359/161 |
| 5,786,918 A | * | 7/1998 | Suzuki et al. | 359/135 |
| 6,233,371 B1 | * | 5/2001 | Kim et al. | 385/11 |
| 6,366,390 B1 | * | 4/2002 | King et al. | 359/264 |
| 6,493,473 B1 | * | 12/2002 | Wooten | 385/11 |
| 6,580,860 B1 | * | 6/2003 | Varner | 385/123 |

* cited by examiner

Primary Examiner—Jason Chan
Assistant Examiner—David C. Payne
(74) Attorney, Agent, or Firm—Barnes & Thornburg

(57) ABSTRACT

The capacity of an optical transmission system can in principle be increased by interleaving two bits streams with orthogonal polarisation states. This requires, in the interleaved bit stream, the bits of one component bit stream to be timed to occur close to midway between the bits of the other component bit stream. Achieving this by adjustment of relative optical path lengths upstream of the interleaver requires control of those lengths to ±200 microns for ±1 ps bit interleaving accuracy. Such precision is awkward to achieve using fusion splicing. Instead, the necessary precision of interleaving accuracy is achieved by trimming a length of birefringent fiber inserted downstream of the interleaving, this fiber oriented to have its principal polarisation planes (principal axes) aligned with the polarisation states of the two bit streams. Employing birefringent fiber with a beat length of 2.5 mm makes adjustment of fiber length for ±1 ps bit interleaving accuracy very readily achievable, being of the order of ±500 mm.

9 Claims, 2 Drawing Sheets

OPTICAL BIT INTERLEAVING

BACKGROUND TO THE INVENTION

There is currently a demand for optical systems to afford ever increasing data transmission capacity. Two approaches are available to increase the transmission capacity of a single optical transmission path. One is to increase the bit rate; the other is to wavelength multiplex more channels on to the transmission path. Problems are associated with both approaches. Increasing the bit rate requires the use of higher speed, and hence generally costlier, electronic and optoelectronic devices, including optical modulators and photodetectors. Increasing the number of channels that are wavelength multiplexed on to a single transmission path increases the optical power density in that transmission path, and this in turn is liable to aggravate problems associated with non-linear effects and polarisation dependent effects in both the system fibre and in any rare-earth doped fibre amplifiers present in the transmission path.

One way of reducing these problems is to modulate two or more streams of pulses at a fraction of the required full bit rate of the or each wavelength channel, and then to recombine the streams in a bit interleaved fashion so as to achieve the full bit rate. Usually such signals are single mode. The combining of several single mode signals into a single combined single mode signal is not normally possible without engendering optical loss because this would involve infraction of the second law of thermodynamics. An exception to this generality occurs in the case of the combining of two polarised signals: two polarised signals can be combined, in theory without loss, if the signals are orthogonally polarised where they are being combined, the combining being effected using a polarisation beam splitter/combiner (PBS/C).

It is clear that, for such a system to work well, the time delay between the individual datastreams must be accurately controlled. Suppose the required precision is that the error shall not exceed ±4%. In the case of interleaving two 20 Gb/s bit streams to produce a single 40 Gb/s combined bit stream, the bit period of the 40 Gb/s bit stream is 25 ps, and hence the required timing precision is that the timing error between the two 20 Gb/s bit streams shall be to within ±1 ps. On the assumption that the light is propagating in single mode optical fibre waveguide having an effective refractive index of approximately 1.5, a differential delay of 25 ps is provided by two optical fibres differing in length by 5 mm with an error not exceeding ±200 $\mu$m. In any practical system of cleaving and splicing optical fibres, such precision in the location of fibre splices is not easily accomplished.

SUMMARY OF THE INVENTION

The present invention is directed to the pulse interleaving of m polarised optical bits streams of the same bit rate to produce an interleaved bit stream of m times that bit rate, and is particularly concerned with the provision of a convenient way of adjusting the relative timings so that the bits of the combined bit stream that are derived from said first bit stream are interleaved with the bits that are derived from said second bit stream with a predetermined relative timing relationship. When two bit streams are being interleaved in this way (i.e. m=2), typically, but not necessarily, the timing relationship is that providing substantially symmetrical interleaving of the bits derived from the two streams.

According to a first aspect of the present invention, there is provided a method of generating a polarisation diversity interleaved optical bit stream in which alternate bits have orthogonal polarisation states, in which method first and second plane polarised optical carrier waves are fed in parallel to first and second optical modulators operating at the same bit rate to produce first and second optically plane polarised modulated bit streams, wherein a polarisation beam-splitter/combiner is employed to combine said first and second modulated bit streams to form a combined bit stream with plane polarised bits, and wherein the combined bit stream is launched into a length of birefringent optical fibre waveguide having principal polarisation planes which, at the launch of the combined bit stream into the fibre, are aligned with the polarisation planes of the combined bit stream, which length is such that, at the end remote from the polarisation beam-splitter/combiner, the bits of the combined bit stream that are derived from said first bit stream are interleaved with the bits that are derived from said second bit stream with a predetermined timing relationship.

The method may thus be seen to be capable of providing a relatively coarse measure of relative timing adjustment up until the PBS/C, and then, with the aid of a cut-back length of birefringent optical fibre waveguide, to refine this relative timing to a higher degree of precision.

A feature of this interleaving is that it produces a combined bit stream whose alternate bits are orthogonally polarised. This provides the additional advantage of reducing some adverse effects of optical non-linearities in the system fibre and polarisation hole burning in optical amplifiers.

According to a second aspect of the present invention, there is provided an optical bit interleaving assembly having, a clock, first and second state of polarisation (SOP) maintaining optical modulators, each provided with an optical input and an optical output, an optical polarisation beam splitter/combiner (PBS/C) with first and second input ports and an output port, each of which ports has first and second principal polarisation planes (PPPs) with the property that a first polarised optical signal launched into the first input port with its SOP aligned with the first PPP of that first input port, and a second polarised optical signal launched into the second input port with its SOP aligned with the second PPP of that second input port, are both coupled substantially completely into the output port to emerge therefrom with their SOPs aligned respectively with the first and second PPPs of that output port, first and second SOP-maintaining optical paths providing respective first and second optical couplings from the outputs of the first and second modulators to the first and second input ports of the PBS/C, and a length of birefringent optical fibre waveguide having first and second PPPS, wherein the clock is connected to provide a clock input to both of said first and second modulators, wherein the first and second SOP-maintaining optical paths are optically coupled respectively with the outputs of the first and second modulators and the first and second input ports of the PBS/C such that any light emergent from the output of each of the first and second modulators with its SOP aligned with either one of the PPPs of that modulator is launched into the corresponding input port of the PBS/C with its SOP aligned with either one of the PPPs of that input port, and wherein the length of birefringent optical fibre waveguide is optically coupled with the output port of the PBS/C with the PPPs of the fibre waveguide aligned with the PPPs of the output port of the PBS/C.

In the succeeding paragraph reference is made to 'optical path length'. For the purposes of this specification, the optical path length of an optical element through which light propagates is defined to mean the product of the physical length through which that light propagates in the element with the effective refractive index experienced by that light in its propagation through the element.

According to a third aspect of the present invention, there is provided a method of making an optical bit interleaving assembly as set out in the preceding paragraph, in which method the first and second lengths of SOP-maintaining optical fibre waveguide are optically coupled respectively with the outputs of the first and second modulators before they are optically coupled with the first and second input ports of the PBS/C, wherein, after the first and second lengths of SOP-maintaining optical fibre waveguide are optically coupled with the outputs of the first and second modulators, but before they are optically coupled with the first and second input ports of the PBS/C, one of those lengths of SOP-maintaining optical fibre waveguide is trimmed in length to make the optical path length from its associated modulator to its end that is optically remote from the modulator differ, by a first predetermined amount with a first level of precision, from the corresponding optical path length between the other modulator and the remote end of its associated length of SOP-maintaining optical fibre waveguide, and wherein, after the first and second lengths of SOP-maintaining optical fibre waveguide are optically coupled with the first and second input ports of the PBS/C, and also after the length of birefringent optical fibre waveguide is optically coupled with the output port of the PBS/C, the end of the length of birefringent optical fibre waveguide that is remote from said PBS/C is cut back in length until the difference in optical path length from each of the modulators to that remote end of the birefringent optical fibre waveguide reaches a second predetermined value with a second level of precision, which second level is proportionately more precise than the first level of precision.

Other features and advantages of the invention will be readily apparent from the following description of a preferred embodiment of the invention, from the drawings and from the claims.

DETAILED DESCRIPTION OF PREFERRED EMBODIMENTS

Figure 1:
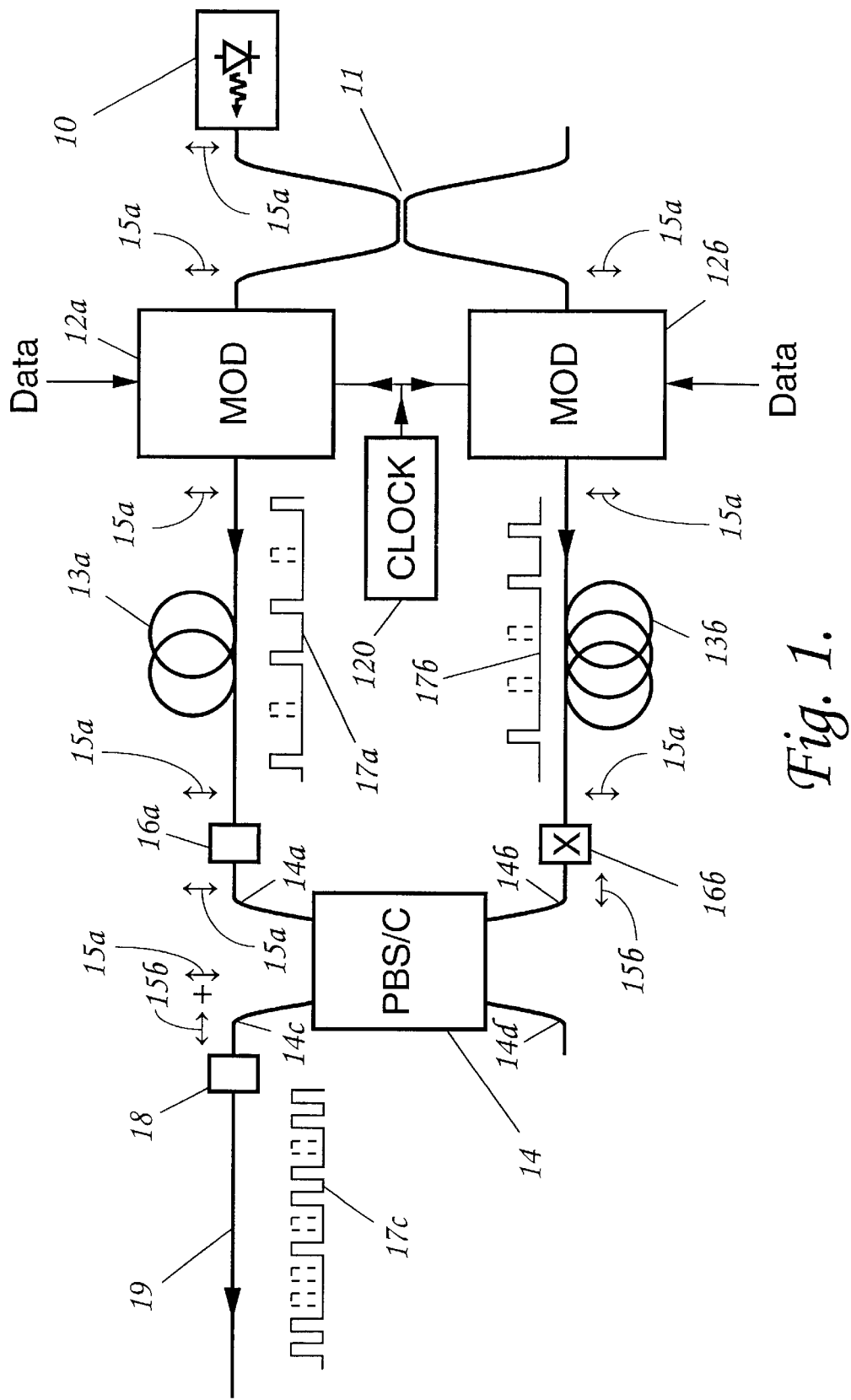
FIG. 1 schematically depicts the general principles involved in obtaining polarisation diversity optical bit interleaving, and FIG. 2 schematically depicts a polarisation diversity optical bit interleaver embodying the present invention in a preferred form.

FIG. 1 shows plane polarised light emitted by a cw or pulsed optical source 10 being divided by a state of polarisation (SOP) maintaining (SOP-maintaining) beam splitter 11 into two substantially equal amplitude components fed respectively to two SOP-maintaining modulators 12$a$ and 12$b$ whose timing is controlled by a common clock 120 so as to maintain a constant timing relationship between their outputs. If the modulators exhibit birefringence or any other SOP-dependent effects, then each modulator is oriented so that the light launched into it is launched with its SOP aligned with one of the two orthogonal principal polarisation planes (PPPs) of that modulator so that the light emerges with the same SOP. The outputs from the two modulators are fed by way of SOP-maintaining paths 13$a$ and 13$b$, for instance constituted by lengths of SOP-maintaining optical fibre waveguide (fibre pigtails), to respective input ports 14$a$ and 14$b$ of a polarisation beam splitter/ combiner (PBS/C) 14. The polarisation beam splitter/combiner is a 4-port device having birefringent properties providing its four ports with PPPs such that light launched into the device by way of either one of its input ports 14$a$ and 14$b$ with its SOP aligned with either one of the PPPs of that port will emerge substantially exclusively by way of one of the output ports 14$c$ or 14$d$ with its SOP aligned with one of the PPPs of that output port. Changing the SOP of the input light to either one of the input ports from alignment with a particular one of the PPPs of that port to alignment with the other PPP causes the light output to switch from one of the two output ports to the other. Arbitrarily, the couplings from input port 14$a$ to output port 14$c$, and from input port 14$b$ to output port 14$d$, will be designated as 'straight-through' couplings, while those from input port 14$a$ to output port 14$d$, and from input port 14$b$ to output port 14$c$ will be designated 'cross-over' couplings. For convenience of illustration, the SOPs aligned with the PPPs so as to provide respectively 'straight-through' and 'cross-over' coupling will be arbitrarily designated respectively as vertical, as indicated in FIG. 1 by double headed arrows 15$a$, and horizontal, as indicated by double headed arrows 15$b$. (since output port 14$d$ is not employed, this port may be omitted from the structure to result in what is effectively a 3-port device.)

The light from laser 10 that is launched, via modulator 12$a$ and link 13$a$, into input port 14$a$ of PBS/C 14 is launched vertically polarised into the PBS/C, and so emerges from it by way of output port 14$c$. Conveniently the same vertical SOP is maintained all the way from the laser to port 14$a$, in which case, if the SOP-maintaining path 13$a$ and the input port 14$a$ are both implemented in optical fibre waveguide, optical coupling between these two components may be effected by means of a 'straight-through' type fibre splice 16$a$ in which the fast axis of the path 13$a$ is aligned with the fast axis of the input port 14$a$ so that the vertical SOP is preserved as the light leaves the path 13$a$ and enters the PBS/C 14.

Correspondingly, the light from laser 10 that is launched, via modulator 12$b$ and link 13$b$, into port 14$b$ of PBS/C 14 is launched horizontally polarised into the PBS/C, and so also emerges from it by way of its output port 14$c$. The laser 10 emits vertically polarised light, and conveniently this vertical SOP is maintained all the way from the laser to SOP-maintaining path 13$b$, in which case, if the SOP-maintaining path 13$b$ and the input port 14$b$ are both implemented in optical fibre waveguide, optical coupling between these two components may be effected by means of a 'cross-over' type fibre splice 16$b$ in which the fast axis of the path 13$b$ is aligned with the slow axis of the input port 14$a$ so that the vertical SOP is converted to the horizontal SOP as the light leaves the path 13$b$ and enters the PBS/C 14.

The two optical modulators 12a and 12b produce respective bit streams 17a and 17b, both at the same bit rate. As specifically illustrated, bit stream 17a has the bit sequence 1 0 1 1 0 1, while bit stream 17b has the bit sequence 1 1 0 0 1. These two bit streams are interleaved by the PBS/C (acting as a beam combiner). Path 13b is made longer than path 13a by the amount required to make bit stream 17b lag bit stream 17a by half a bit period so to produce, at the output port 14c, the bit stream 17c. The bit stream 17c has twice the bit rate of bit streams 17a and 17b and, as specifically illustrated, has the bit sequence 1 1 0 1 1 0 1 0 0 1 1. This output port 14c of the PBS/C 14 may be optically coupled with a further splice 18 to a length 19 of transmission type optical fibre waveguide (system fibre), fibre that possesses substantial circular symmetry, and hence fibre that does not exhibit SOP-maintaining properties.

In the foregoing description relating specifically to FIG. 1 it was stated that path 13b is made longer than path 13a 'by the amount required to make bit stream 17b lag bit stream 17a by half a bit period', but no explanation was then given as to how this length difference criterion was to be achieved in practice. As mentioned previously, to achieve a bit interleaving accuracy to within ±4% requires, in the instance of interleaving two 20 Gb/s bit streams, achieving a timing accuracy to within ±1 ps. If this is to be provided by the difference in length between the optical paths 13a and 13b then, on the assumption that these paths are in optical fibre waveguide with an effective refractive index of 1.5, these lengths must be controlled with a precision that establishes the length difference to within ±200 $\mu$m. In other words, a cleave and splice positioning accuracy to within ±100 $\mu$m is demanded for each of the two paths 13a and 13b. The need for meeting such precision in the relative optical path lengths of paths 13a and 13b is avoided by the expedient adopted in the bit interleaver of FIG. 2.

Figure 2:
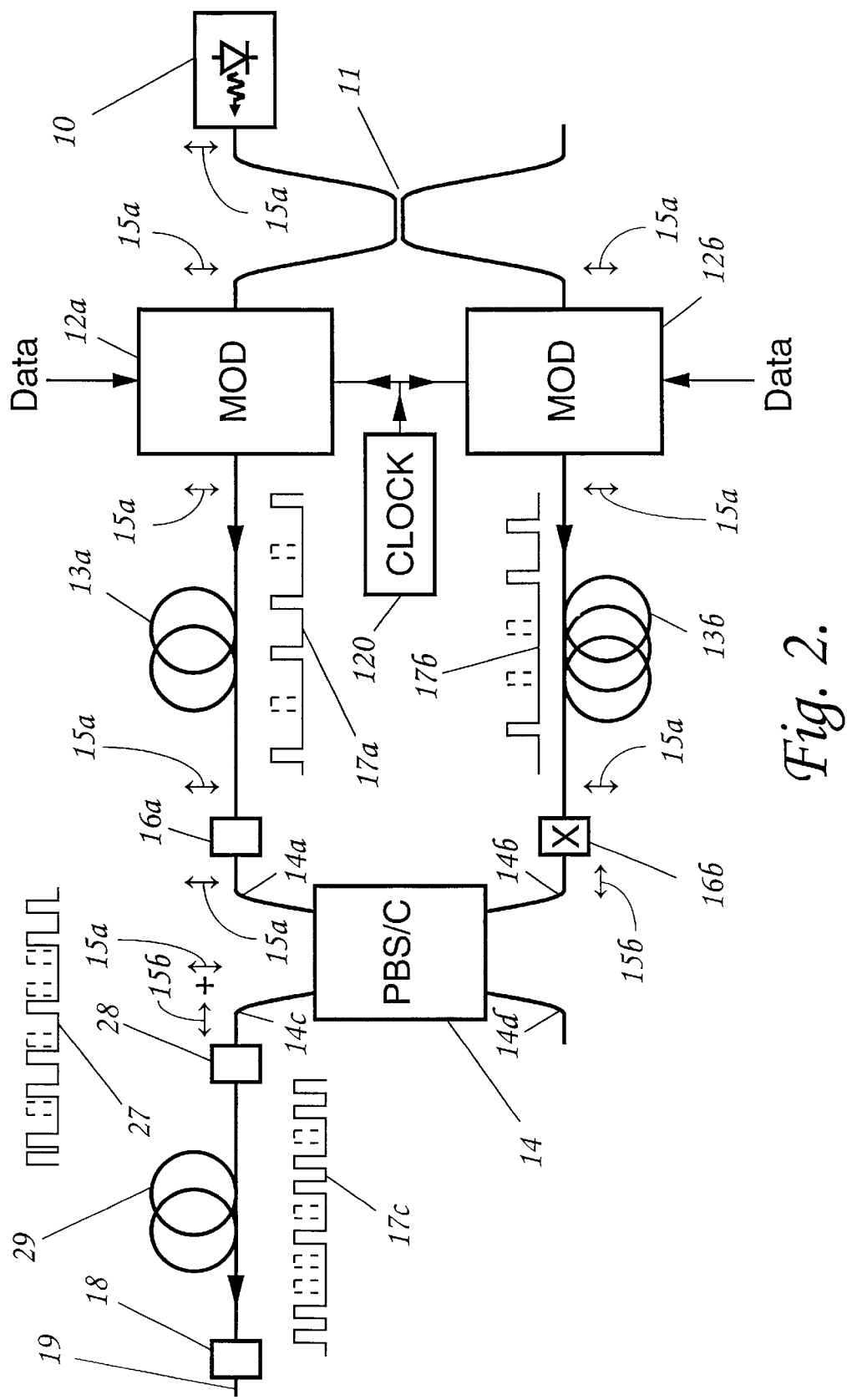

Each component of the interleaver of FIG. 2 that has its counterpart in FIG. 1 is identified in FIG. 2 with the same index numeral as was employed to identify that FIG. 1 counterpart. In addition to the elements described previously with reference to FIG. 1, the interleaver of FIG. 2 has a length 29 of birefringent (SOP-maintaining) optical fibre waveguide inserted between the output port 14c of the PBS/C 14 and the output of the interleaver itself. This length 29 of birefringent fibre is optically coupled with the output port 14c, for instance by means of a fibre splice 28, in such a manner that the PPPs of the fibre 29 are aligned with the PPPs of the output port 14c. In this way it is ensured that all the bits of the interleaved bit stream that are derived from either one of the modulators 12a and 12b propagate in the fibre 29 with a single (neglecting any chromatic dispersion effects) group velocity that is different from that with which the bits derived from the other modulator propagate. Accordingly there is progressive relative timing slippage between these two sets of bits as they propagate along fibre 29. Consider now the situation in which the splices 16a and 16b are not fabricated in the relative positions that will provide, in the output from port 14a, the required half bit period lag of bit stream 17b with respect to bit stream 17a, but instead a different relative timing relationship, such as that depicted in bit stream 27. When this bit stream 27 is launched into fibre 29, the progressive relative timing slippage that occurs between the bits derived from bit stream 17a with respect to those derived from bit stream 17b means that at a certain distance down the fibre 29 the relative timing relationship arrives at the required half bit period value, thereby producing the bit stream depicted at 17c. Initially the fibre 29 is part of a longer fibre (not shown) that is cut back to the required length producing the required relative timing relationship at the end of the fibre 29 remote from output port 14a. Optionally, this end of the fibre 29 remote from output port 14a may be optically coupled, by means of the splice 18, with the fibre 19 that does not exhibit SOP-maintaining properties.

It has earlier been shown that if the paths 13a and 13b are constructed in optical fibre waveguide having an effective refractive index of 1.5, then a change in length of one of these paths by only 200 $\mu$m produces a 1 ps slippage in the timing of the bits of bit stream 27 derived from bit stream 17b relative to those derived from bit stream 17a. A much greater change in the length of fibre 29 is required to produce the same magnitude of slippage. Thus a typical birefringent fibre may exhibit a beat length of about 2.5 mm for light of a (free-space) wavelength of about 1500 nm. One beat period is the distance over which the fast and slow axis propagation times in the fibre differ by one temporal period, i.e. in this instance, the 2.5 mm beat length corresponds to the distance over which the fast and slow axis propagation times differ by about 5 fs. Accordingly, about 50 cm of this fibre is required to produce the 1 ps slippage. There is clearly normally no difficulty in cutting back and splicing a length of fibre to a precision not exceeding ±50 cm.

In order to ensure that higher order modes are adequately attenuated in the fibre 29, it is generally desirable to ensure that this fibre is not shorter than a certain given length, typically a length of 1 meter. In the case of the 2.5 mm beat length fibre, this corresponds to a 2 ps propagation time difference. Accordingly, if the bit interleaving needs to be produced specifically by a single half bit period delay (rather than any other odd integral number of half bit period delays), then the maximum propagation time difference afforded by the difference in length between paths 14a and 14b should not exceed 23 ps in the case of the 40 Gb/s interleaved bit stream. Before making the splices 16a and 16b, optical time domain reflectometry (OTDR) can be used to determine the difference in optical path length between the coupling region of the beam splitter 11 and the optically remote ends of the optical paths 13a and 13b. It is of course the relative optical path lengths between the modulators 12a, 12b and those remote ends which is the significant parameter but, particularly if the beam splitter 11 is integrated with the modulators, the optical path lengths between the coupling region of the beam-splitter 11 and the modulators is known with a relatively high degree of precision. Accordingly the OTDR measurement is adequate for the purpose of enabling the remote ends to be cleaved to length (ready for splicing) with an adequate degree of precision, typically ±500 m per splice. Under these circumstances, the uncertainty in the differential delay at the input to the PBS/C 14 will be ±5 ps, and the splices 16a and 16b will be located for a target differential delay of 18 ps ±5 ps. Since this will provide a minimum differential delay of 13 ps, the initial length of the fibre 29 before cut-back will need to be at least 6 meters so as to be capable of providing a differential delay of at least 12 ps in order to achieve the desired aggregate of 25 ps.

OTDR can then be used to determine the difference in optical path length between the coupling region of the beam splitter 11 and the optically remote end of fibre 29 (before cut-back) respectively via modulator 12a and via modulator 12b. Once this is known, the fibre 29 can be cut back to the length necessary to provide the required optical path length difference, and hence the required differential delay between the two modulators and the remote end of the fibre 29. If this fibre 29 is present in the form of a winding upon a mandrel (not shown) with a 40 mm radius, then each turn of the coil is approximately 250 mm long, providing a convenient quantum of cut-back length that very readily enables the cut-back to be effected to the desired value with a precision providing a delay difference error not exceeding about 0.5 ps.

Thus far in the specific description relating particularly to FIGS. 1 and 2, attention has been confined to the interleaving of just two bit streams of the same bit rate, but it should be understood that the invention is applicable also to the interleaving of more than two bit streams of the same bit rate. It is applicable, for instance, to the interleaving of four bit streams of the same bit rate. If these four bit streams are labelled A, B, C and D, then desirably, in the combined bit stream, bits derived from stream B should be a quarter of an uninterleaved bit period behind those derived from stream A, and those derived from streams C and D should be respectively half, and three-quarters of, an uninterleaved bit period behind those derived from stream A. The four bit streams are interleaved in two stages. In the first stage, bit streams are interleaved in two separate pairs, either alternate pairs (i.e. A interleaved with C, and B interleaved with D), or adjacent pairs (i.e. A interleaved with B, and C interleaved with D). In the second stage, the two interleaved pairs of bit streams are themselves interleaved. If alternate pair interleaving is employed in the first stage, then in both instances of first stage interleaving, the interleaving proceeds as particularly described above with reference to FIG. 2, with the timing relationship providing symmetrical interleaving of the bits derived from one stream of a first stage interleaving with those derived from the other bit stream of the interleaving. On the other hand, if adjacent pair interleaving is employed in the first stage, then the timing relationship will not be the symmetrical relationship, but a relationship in which the bits derived from one of the bit streams is delayed by quarter of an uninterleaved bit period with respect to the bits of the other stream.

In both instances, the first stage interleaving produces bit streams in which alternate bits have orthogonal SOPs, and so these interleaved bit streams do not emerge from their interleavers in a form immediately suitable for themselves to be interleaved in the manner taught by the present invention. This requires all the bits of each of the two first stage interleaved bit streams to have the same SOP. Then, with the bits of one of the first stage interleaved bit streams all having an SOP orthogonal with respect to that of all of the bits of the other first stage interleaved bit stream, the method of the present invention is directly applicable to perform the second stage interleaving, i.e. to interleave these first stage interleaved bit streams. One way of converting an interleaved bit stream in which alternate bits have orthogonal SOPs into an interleaved bit stream with all its bits having the same SOP is to pass that bit stream through a polariser with its PPPs at 45 ° to the orthogonal SOPs of the unconverted bit stream. A certain drawback of this approach is that it discards half the power.

What is claimed is:

1. A method of generating a polarisation diversity interleaved optical bit stream in which alternate bits have orthogonal polarisation states,
   in which method first and second plane polarised optical carrier waves are fed in parallel to first and second optical modulators operating at the same bit rate to produce first and second optically plane polarised modulated bit streams,
   wherein a polarisation beam-splitter/combiner is employed to combine said first and second modulated bit streams to form a combined bit stream with plane polarised bits, and
   wherein the combined bit stream is launched into a length of birefringent optical fibre waveguide having principal polarisation planes which, at the launch of the combined bit stream into the fibre, are aligned with the polarisation planes of the combined bit stream, which length is such that, at the end remote from the polarisation beam-splitter/combiner, the bits of the combined bit stream that are derived from said first bit stream are interleaved with the bits that are derived from said second bit stream with a predetermined relative timing relationship.

2. A method as claimed in claim 1, wherein the first and second optical carrier waves are derived from a common source.

3. A method as claimed in claim 1, wherein the predetermined relative timing relationship is the relationship providing substantially symmetrical interleaving of the bits of the combined bit stream that are derived from said first bit stream with the bits that are derived from said second bit stream.

4. An optical bit interleaving assembly having, a clock,
   first and second state of polarisation (SOP) maintaining optical modulators, each provided with an optical input and an optical output,
   an optical polarisation beam splitter/combiner (PBS/C) with first and second input ports and an output port, each of which ports has first and second principal polarisation planes (PPPs) with the property that a first polarised optical signal launched into the first input port with its SOP aligned with the first PPP of that first input port, and a second polarised optical signal launched into the second input port with its SOP aligned with the second PPP of that second input port, are both coupled substantially completely into the output port to emerge therefrom with their SOPs aligned respectively with the first and second PPPs of that output port,
   first and second SOP-maintaining optical paths providing respective first and second optical couplings from the outputs of the first and second modulators to the first and second input ports of the PBS/C, and
   a length of birefringent optical fibre waveguide having first and second PPPs,
   wherein the clock is connected to provide a clock input to both of said first and second modulators,
   wherein the first and second SOP-maintaining optical paths are optically coupled respectively with the outputs of the first and second modulators and the first and second input ports of the PBS/C such that any light emergent from the output of each of the first and second modulators with its SOP aligned with either one of the PPPs of that modulator is launched into the corresponding input port of the PBS/C with its SOP aligned with either one of the PPPs of that input port, and
   wherein the length of birefringent optical fibre waveguide is optically coupled with the output port of the PBS/C with the PPPs of the fibre waveguide aligned with the PPPs of the output port of the PBS/C.

5. An assembly as claimed in claim 4, wherein an optical source is optically coupled to the inputs of both of said first and second modulators.

6. An assembly as claimed in claim 4, wherein said SOP-maintaining optical paths providing respective first and second optical couplings from the outputs of the first and second modulators to the first and second input ports of the PBS/C are constituted respectively by first and second lengths of SOP-maintaining optical fibre waveguide.

7. A method of making an assembly as claimed in claim 6, in which method said first and second lengths of SOP-maintaining optical fibre waveguide are optically coupled respectively with the outputs of the first and second modulators before they are optically coupled with said first and second input ports of the PBS/C, wherein, after said first and second lengths of SOP-maintaining optical fibre waveguide are optically coupled with said outputs of the first and second modulators, but before they are optically coupled with said first and second input ports of the PBS/C, one of said first and second lengths of SOP-maintaining optical fibre waveguide is trimmed in length to make the optical path length from its associated modulator to its end that is optically remote from said modulator differ, by a first predetermined amount with a first level of precision, from the corresponding optical path length between the other modulator and the remote end of its associated length of SOP-maintaining optical fibre waveguide, and wherein, after said first and second lengths of SOP-maintaining optical fibre waveguide are optically coupled with said first and second input ports of the PBS/C, and also after said length of birefringent optical fibre waveguide is optically coupled with the output port of the PBS/C, the end of said length of birefringent optical fibre waveguide that is remote from said PBS/C is cut back in length until the difference in optical path length from each of said modulators to said remote end of said birefringent optical fibre waveguide reaches a second predetermined value with a second level of precision, which second level is proportionately more precise than said first level of precision.

8. A method as claimed in claim 7, wherein the difference in optical path length from each of said modulators to said remote end of said birefringent optical fibre waveguide is measured using optical time domain reflectometry.

9. A method as claimed in claim 8, wherein the difference in optical path length from each of said first and second modulators respectively to said remote ends of said first and second lengths of SOP-maintaining optical fibre waveguide is measured using optical time domain reflectometry.

* * * * *